United States Patent
Yamamoto et al.

(10) Patent No.: US 11,434,609 B2
(45) Date of Patent: Sep. 6, 2022

(54) BASE PAPER FOR PAPER TUBE, AND PAPER TUBE

(71) Applicant: NIPPON PAPER INDUSTRIES CO., LTD., Tokyo (JP)

(72) Inventors: Junji Yamamoto, Tokyo (JP); Youko Jyoumei, Tokyo (JP); Kenji Hirai, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 17/276,092

(22) PCT Filed: Sep. 19, 2019

(86) PCT No.: PCT/JP2019/036822
§ 371 (c)(1),
(2) Date: Mar. 12, 2021

(87) PCT Pub. No.: WO2020/059818
PCT Pub. Date: Mar. 26, 2020

(65) Prior Publication Data
US 2022/0042247 A1    Feb. 10, 2022

(30) Foreign Application Priority Data
Sep. 21, 2018   (JP) .............................. JP2018-177178

(51) Int. Cl.
*D21H 27/36* (2006.01)
*B32B 1/08* (2006.01)
(Continued)

(52) U.S. Cl.
CPC ............... *D21H 27/36* (2013.01); *B32B 1/08* (2013.01); *B32B 7/12* (2013.01); *B32B 29/005* (2013.01); *A47G 21/18* (2013.01); *A47G 2400/10* (2013.01); *B32B 2307/732* (2013.01); *B32B 2597/00* (2013.01)

(58) Field of Classification Search
CPC .. D21H 27/36; B32B 1/08; B32B 7/12; B32B 29/005; B32B 2307/732; B32B 2597/00
See application file for complete search history.

(56) References Cited

U.S. PATENT DOCUMENTS 3,581,744 A    6/1971   Yoss et al.

FOREIGN PATENT DOCUMENTS

| JP | H06133840 A | 5/1994 |
| JP | H10330572 A | 12/1998 |

(Continued)

OTHER PUBLICATIONS

International Search Report (ISR) dated Dec. 17, 2019, issued for International application No. PCT/JP2019/036822. (2 pages).

(Continued)

*Primary Examiner* — Michael C Miggins
(74) *Attorney, Agent, or Firm* — Law Office of Katsuhiro Arai

(57) ABSTRACT

An object is to provide a base paper for paper tubes that has lower environmental impact and is used for manufacturing of paper tubes offering excellent water resistance. As a solution, a base paper for paper tubes is provided, wherein: it has two or more but no more than five paper layers; the paper layers are bonded by a water-soluble or water-dispersible adhesive; and its elution rate is 2.0 percent or lower.

5 Claims, 1 Drawing Sheet

(51) Int. Cl.
B32B 7/12 (2006.01)
B32B 29/00 (2006.01)
A47G 21/18 (2006.01)

(56) References Cited

FOREIGN PATENT DOCUMENTS

| | | |
|---|---|---|
| JP | 2000204340 A | 7/2000 |
| JP | 2002003806 A | 1/2002 |
| JP | 2009233348 A | 10/2009 |
| JP | 2013022306 A | 2/2013 |
| JP | 2016190744 A | 11/2016 |
| JP | 2017132612 A | 8/2017 |
| WO | 2014075131 A1 | 5/2014 |

OTHER PUBLICATIONS

Notification Concerning Transmittal of International Preliminary Report on Patentability (PCT/IB/326) and Notification of Transmittal of Translation of the International Preliminary Report on Patentability (PCT/IB/338) dated Apr. 1, 2021, with International Preliminary Report on Patentability (PCT/IB/373) and Written Opinion of the International Searching Authority (PCT/ISA/237), for corresponding international application PCT/JP2019/036822 (13 pages).

Extended European Search Report (EESR) dated Mar. 5, 2022, issued for European counterpart patent application No. EP19861433.1 (6 pages).

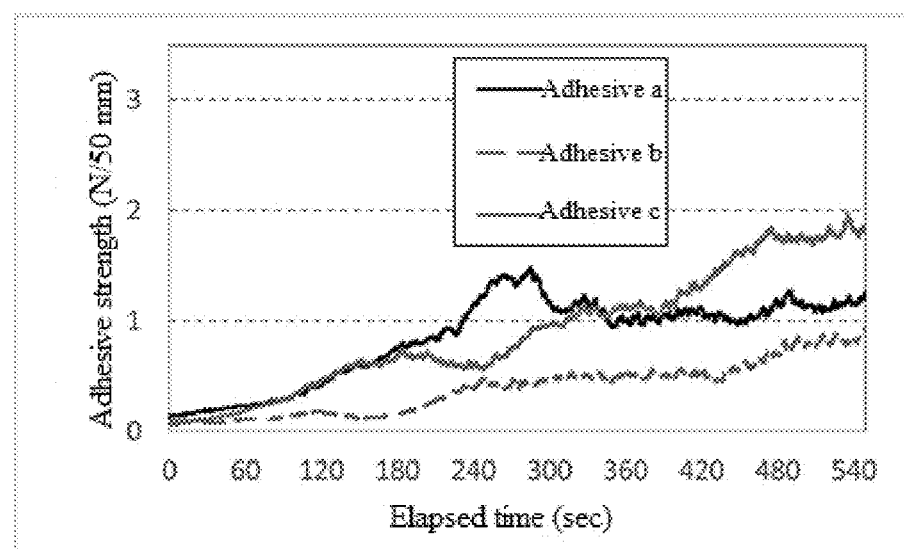

BASE PAPER FOR PAPER TUBE, AND PAPER TUBE

CROSS-REFERENCE TO RELATED APPLICATIONS

This application is the U.S. National Phase under 35 U.S.C. § 371 of International Application PCT/JP2019/036822, filed Sep. 19, 2019, which claims priority to Japanese Patent Application No. JP2018-177178, filed Sep. 21, 2018. The International Application was published under PCT Article 21(2) in a language other than English.

TECHNICAL FIELD

The present invention relates to a base paper for a paper tube, as well as a paper tube, especially a paper tube offering excellent water resistance, made of such base paper for paper tube.

BACKGROUND ART

Plastics are widely used as materials for various products because they are inexpensive and can be formed easily, and at least 300 million tons of plastic products are produced annually.

Although many plastic products are properly disposed of, some enter the environment as waste due to mismanagement or illegal dumping and eventually flow into the oceans. It is estimated that at least eight million tons of plastic waste ends up in the oceans per year, and a lot of this plastic waste, being non-biodegradable in nature, is almost entirely accumulated in the oceans.

Efforts are underway to prevent environmental destruction caused by plastic waste, and there are calls for replacing disposable plastic products with materials having lower environmental impact. In particular, environmental protection groups, etc., are calling for a ban on using plastic straws that are consumed by over 500 million units just in the United States or over one billion units around the world every day and reportedly causing deaths by accidental ingestion in sea birds and sea turtles.

Along with biodegradable plastics, paper is drawing attention as an alternative material for plastic straws that has lower environmental impact.

For example, paper straws are proposed in Patent Literatures 1 and 2. To make paper, which has poor water resistance, into straws, however, a thermoplastic resin is applied on a paper material in Patent Literature 1, while a polyethylene film or aluminum foil is attached on both the interior and exterior sides of a paper base material in Patent Literature 2.

BACKGROUND ART LITERATURE

Patent Literature

Patent Literature 1: Japanese Patent Laid-open No. Hei 06-133840
Patent Literature 2: Japanese Patent Laid-open No. 2009-233348

SUMMARY OF THE INVENTION

Problems to be Solved by the Invention

An object of the present invention is to provide a base paper for a paper tube that has lower environmental impact and is used for manufacturing of paper tubes offering excellent water resistance.

Means for Solving the Problems

The means for achieving the object of the present invention are as follows:
1. A base paper for paper tubes characterized in that:
  it has two or more but no more than five paper layers;
  the paper layers are bonded by a water-soluble or water-dispersible adhesive; and its elution rate is 2.0 percent or lower.
2. The base paper for paper tubes according to 1, characterized in that the outermost layer of the paper layers has a surface smoothness of 150 seconds or higher based on JIS P 8155: 2010 (Oken Method).
3. The base paper for paper tubes according to 1 or 2, characterized in that the outermost layer of the paper layers has a thickness of 25 µm or more but no more than 100 µm.
4. The base paper for paper tubes according to any one of 1 to 3, characterized in that the adhesive is water-dispersible.
5. A paper tube characterized in that it is made of the base paper for paper tubes according to any one of 1 to 4.
6. The paper tube according to 5, characterized in that its diameter is 3 mm or more but no more than 20 mm.

Effects of the Invention

The base paper for paper tubes proposed by the present invention is primarily paper and has lower environmental impact. Also, it has lower environmental impact during manufacturing because a water-soluble adhesive or water-dispersible adhesive is used. Using a highly safe water-soluble adhesive or water-dispersible adhesive and also having a low elution rate, the base paper for paper tubes proposed by the present invention can be used suitably for straws, stir sticks, and other paper tubes that come in contact with beverages and mouths (hereinafter also referred to as "paper utensil tubes").

The base paper for paper tubes whose outermost layer has a surface smoothness of 150 seconds or higher based on JIS P 8155: 2010 (Oken Method) produces less sticking feel and unpleasant sensation on the lips and tongue, and thus can be used suitably as a straw. When the paper tube is formed by spiral rolling, with the thickness of its outermost paper layer set to 25 µm or more but no more than 100 µm, the formed paper tube can have a smooth exterior surface.

BRIEF DESCRIPTION OF THE DRAWINGS

FIG. 1A graph showing how the adhesive force changes over time.

MODE FOR CARRYING OUT THE INVENTION

\<Base Paper for Paper Tube\>
Details of the present invention are explained below.
The base paper for paper tubes (hereinafter also referred to as the "base paper") proposed by the present invention is characterized in that: the base paper has two or more but no more than five paper layers; these paper layers are bonded by a water-soluble or water-dispersible adhesive; and the base paper has an elution rate of 2.0 percent or lower.

In this Specification, the elution rate refers to the value calculated by the method below.

(Elusion Rate)

The base paper for paper tube D (g) (approx. 2 to 3 g) is cut to 1-cm squares and then put in a beaker of 100 ml in capacity along with 50 ml of ultrapure water (25° C.), and the mixture is agitated for 2 hours at 600 rpm.

When the agitation is complete, the mixture is suction-filtered using a filtration paper (Filtration Paper No. 2, manufactured by Advantec MFS, Inc.) and separated into solids content and liquid solution. The obtained liquid solution is dried and solidified for 24 hours at 100° C. and the weight d (g) of the precipitated solids content is measured, to calculate the elution rate according to Formula (1) below:

$$\text{Elution rate } (\%) = d(g)/D(g) \times 100 \quad \text{(Formula 1)}$$

Due to its low elution rate of 2.0 percent or lower, the base paper proposed by the present invention can be suitably utilized as a base paper for paper utensil tubes. Also, while some eluting components can cause liquids to become cloudy or give off a foul smell, the base paper proposed by the present invention can prevent such clouding or foul smell from occurring because of its low elution rate. Under the present invention, the elution rate is preferably 1.5 percent or lower, or more preferably 1.0 percent or lower, or yet more preferably 0.7 percent or lower. It should be noted that the majority of the components that elute from the base paper proposed by the present invention are derived from the adhesive, and components derived from papermaking chemicals and other auxiliary agents are negligible.

The base paper proposed by the present invention has two or more but no more than five paper layers. The smaller the number of paper layers, the more excellent water resistance becomes; however, rollability drops because rolling the base paper into a paper tube of small diameter becomes difficult. Accordingly, the number of paper layers should be adjusted as deemed appropriate according to water resistance and rollability.

Preferably the base paper proposed by the present invention has an overall basis weight of 150 g/m² or more but no more than 400 g/m². If the basis weight is less than 150 g/m², the base paper may not provide sufficient rigidity when used as a straw. If the basis weight exceeds 400 g/m², rolling the base paper into a paper tube may become difficult. The lower limit of basis weight is preferably 180 g/m² or higher, or more preferably 200 g/m² or higher. Also, the upper limit of basis weight is preferably 370 g/m² or lower, or more preferably 350 g/m² or lower.

While the base paper proposed by the present invention has two or more but no more than five paper layers, preferably the surface of the outermost paper layer has a smoothness of 150 seconds or higher based on JIS P 8155: 2010 (Oken Method). Paper tubes made of a base paper whose outermost layer has a surface smoothness of 150 seconds or higher are desirable because they produce less sticking feel and unpleasant sensation on the lips and tongue when held in one's mouth. This smoothness is preferably 200 seconds or higher, or more preferably 500 seconds or higher. Especially when the smoothness is 1,000 seconds or higher, paper tubes that feel just like conventional plastic straws can be obtained. It should be noted here that, in this Specification, "innermost layer" and "outermost layer" refer to the layer positioned on the innermost side, and the layer positioned on the outermost side, in a paper tube state, respectively.

Also, when its outermost layer is a paper layer having water resistance, the base paper can prevent water and other liquids from entering through the outermost layer when used as a straw, and therefore delamination of paper layers becomes less likely when immersed in liquids, which is desirable. Also, when immersed in colored liquids, the base paper does not easily absorb the liquids and become colored, which is desirable. Here, "water resistance" refers to a property of a paper layer to maintain its shape for two hours or so in a water-immersed state and, even after undergoing slight swelling, etc., to not cause strength-related problems in practical settings.

Preferably the base paper proposed by the present invention is such that the thickness of its outermost paper layer is 25 μm or more but no more than 100 μm. If the thickness of the outermost paper layer is within the aforementioned range, a smoother paper tube can be formed when the base paper is spiral-rolled into a paper tube, because the height gaps at the overlapping parts will decrease in the width direction of the base paper. If the thickness of the outermost paper layer is less than 25 μm, poor rollability may result from the paper breaking or wrinkling easily during paper tube manufacturing. Also, the base paper will break easily due to impact, etc., especially when immersed in liquids. If the thickness of the outermost paper layer is greater than 100 μm, on the other hand, rolling the base paper into a paper tube will become difficult, leading, again, to poor rollability. Also, the edge parts will peel easily, especially when immersed in liquids. It should be noted that, in the base paper proposed by the present invention, the thickness and basis weight of each layer may be the same or different.

<Paper Layers>

Under the present invention, a paper layer is a layer constituted by pulp, filler, various auxiliary agents, etc.

If the base paper for paper tubes proposed by the present invention is used as a base paper for paper utensil tubes, preferably materials that have been approved as food additives, or are FDA-certified or otherwise conforming to food safety regulations, are used.

For the pulp, any of known pulps may be compounded and used as deemed appropriate, such as: needle bleached kraft pulp (NBKP), needle unbleached kraft pulp (NUKP), leaf bleached kraft pulp (LBKP), leaf unbleached kraft pulp (LUKP), sulfite pulp (SP), and other wood chemical pulps; ground pulp (GP), refiner ground pulp (RGP), stone ground pulp (SGP), chemi-ground pulp (CGP), semi-chemical pulp (SCP), thermomechanical pulp (TMP), chemi-thermomechanical pulp (CTMP), and other wood mechanical pulps; non-wood pulps obtained from kenaf, bagasse, bamboo, hemp, straw, etc.; and used paper pulps obtained by removing from used paper, which is used as raw material, any inks contained in the used paper by means of a deinking process.

It should be noted that, if the base paper for paper tube proposed by the present invention is used as a base paper for paper utensil tubes, LBKP, NBKP, or other chemical pulp resistant to mixing-in of foreign contaminants is preferred, and the compounding quantity of used paper pulp is preferably small. To be specific, the compounding quantity of chemical pulp is preferably 80 percent by mass or higher, or more preferably 90 percent by mass or higher, or yet more preferably 95 percent by mass or higher, or most preferably 100 percent by mass, relative to the total quantity of pulp.

For the filler, any of known fillers may be used, such as: talc, kaolin, calcined kaolin, clay, heavy calcium carbonate, light calcium carbonate, white carbon, zeolite, magnesium carbonate, barium carbonate, titanium dioxide, zinc oxide, silicon oxide, amorphous silica, aluminum hydroxide, calcium hydroxide, magnesium hydroxide, zinc hydroxide, barium sulfate, calcium sulfate, and other inorganic fillers; and urea-formalin resin, polystyrene resin, phenol resin, fine hollow particles, and other organic fillers. It should be noted that the filler is not an essential material and need not be used.

For the various auxiliary agents, any auxiliary agents may be selected and used as deemed appropriate, where examples can include: rosin, alkyl ketene dimer (AKD), alkenyl succinate anhydride (ASA), or other sizing agent, polyacrylic amide polymer, polyvinyl alcohol polymer, cationized starch, any of various other modified starches, urea-formalin resin, melamine-formalin resin, or other dry paper strength-enhancing agent, wet paper strength-enhancing agent, yield-improving agent, drainage aids, coagulating agent, aluminum sulfate, bulking agent, dye, fluorescent brightening agent, pH adjuster, defoaming agent, ultraviolet-protective agent, fading inhibitor, pitch-controlling agent, and slime controlling agent.

Under the present invention, preferably the paper layers contain a wet paper strength-enhancing agent. For the wet paper strength-enhancing agent, polyamide polyamine epichlorohydrin resin, polyamine epichlorohydrin resin, polyamide epichlorohydrin resin, polyvinyl amine resin, polyethylene imine resin, etc., may be used. Among these, polyamide polyamine epichlorohydrin resin is preferred.

The wet paper strength-enhancing agent is added during manufacturing by preferably 0.1 percent by mass or more but no more than 1.5 percent by mass, or more preferably 0.5 percent by mass or more but no more than 1.0 percent by mass, relative to the total pulp.

The quantity of wet paper strength-enhancing agent can be determined by the Kjeldahl method, energy dispersive X-ray analysis or other element analysis. Under the present invention, the quantity of wet paper strength-enhancing agent contained in the paper layers represents an equivalent value assuming that the entire quantity of nitrogen determined using the Kjeldahl method is derived from polyamide polyamine epichlorohydrin resin. Preferably the paper layers contain a wet paper strength-enhancing agent by 0.05 percent by mass or more but no more than 0.70 percent by mass relative to the total quantity of pulp.

<Adhesive>

The adhesive bonds the adjoining paper layers together.

While the present invention uses a water-soluble adhesive or water-dispersible adhesive as the adhesive, preferably a water-dispersible adhesive is used.

Water-soluble adhesives are generally difficult to achieve a high solids content concentration and, even when a high solids content concentration can be achieved, their viscosity may rise, reducing the ease of handling. Water-dispersible adhesives, on the other hand, are easier than water-soluble adhesives to achieve a high solids content concentration and their viscosity remains roughly constant regardless of the solids content concentration. Accordingly, water-dispersible adhesives, when adjusted to a high solids content concentration, can shorten the time from adhesive application to water volatilization and manifestation of adhesive strength. Especially when at least one of the paper layers is a paper layer having water resistance, which may lead to a longer time to manifestation of adhesive strength, use of a water-dispersible adhesive can shorten the time to manifestation of adhesive strength and thus effectively prevent delamination between paper layers immediately after manufacturing. Also, the curing process can be shortened or eliminated.

Water-soluble adhesives and water-dispersible adhesives that may be used under the present invention include, for example: water-soluble adhesives based on polyvinyl alcohol, polyethylene oxide, polyacrylic amide, starch, gelatin, casein, ether cellulose, phenol resin, water glass, etc.; and water-dispersible adhesives based on acrylic, vinyl acetate, ethylene-vinyl acetate copolymer, styrene-butadiene copolymer, urethane, α-olefin, etc. Among these, preferred water-soluble adhesives are those based on polyvinyl alcohol and phenol resin, while preferred water-dispersible adhesives are those based on acrylic and styrene-butadiene copolymer, because they can keep the elution rate low.

<Papermaking and Bonding Methods>

The method for manufacturing paper layers (papermaking) and type of paper machine are not limited in any way, and a Fourdrinier paper machine, twin-wire paper machine, cylinder paper machine, gap former, hybrid former (on-top former), or any other known manufacturing (papermaking) method/paper machine can be selected.

Also, the papermaking pH level may be in the acidic region (acidic papermaking), pseudo-neutral region (pseudo-neutral papermaking), neutral region (neutral papermaking), or alkaline region (alkaline papermaking), and an alkaline chemical may also be applied on the paper layer surface after the papermaking has been performed in the acidic region.

The method for bonding paper layers is not limited in any way, and it may be, for example, a method whereby paper layers obtained through the papermaking and drying processes are cut to a prescribed width and then bonded, or a method whereby paper layers obtained through the papermaking process are bonded while wet and then dried and cut.

<Paper Tube>

Paper tubes can be manufactured from the base paper for paper tubes proposed by the present invention. The paper tube shape is not limited in any way and may be a cylinder, polygonal cylinder, etc. The method for manufacturing paper tubes is not limited in any way and they can be manufactured according to spiral rolling, flat rolling, or other known method; however, spiral rolling is preferred because it permits continuous production.

The paper tube diameter is not limited in any way and various diameters may be adopted according to the purpose. Given the excellent water resistance of paper tubes conforming to the present invention, for example, those paper tubes having a diameter of 3 mm or more but no more than 20 mm can be utilized suitably, while others having a diameter of 4 mm or more but no more than 15 mm can be utilized more suitably, as paper utensil tubes. It should be noted that, under the present invention, the paper tube diameter indicates the outer diameter of the paper tube.

EXAMPLES

Table 1-1 and Table 1-1 below show the paper layers and adhesives used, respectively.

TABLE 1-1

|  |  | Basis weight g/m$^2$ | Paper thickness μm | Smoothness sec |
|---|---|---|---|---|
| Paper layers | A | 30 | 30 | 1547 |
|  | B | 90 | 120 | 51 |

TABLE 1-1-continued

|   | Basis weight g/m² | Paper thickness μm | Smoothness sec |
|---|---|---|---|
| C | 110 | 130 | 12 |
| D | 50 | 78 | 152 |

TABLE 1-2

|   |   |   | Solids content concentmtion % |
|---|---|---|---|
| Adhesives | a | Water-dispersible | 50 |
|   | b | Water-soluble | 10 |
|   | c | Water-dispersible | 45 |

TABLE 2

|   | Paper layers | | | Elution | Peeling | | |
|---|---|---|---|---|---|---|---|
|   | Innermost layer | Outermost layer | Adhesive | rate % | Immediately after | 60 minutes after | Sticking feel |
| Example 1 | A/B/C | | a | 0.68 | ○ | ○ | X |
| Example 2 | A/B/C | | b | 0.99 | Δ | ○ | X |
| Comparative Example 1 | A/B/C | | c | 2.17 | ○ | ○ | X |

Example 1

Paper layers A, B, and C were coated with adhesive a (water-dispersible adhesive, based on acrylic) to a solids content of 20 g/m² between each pair of layers and then stacked, spiral-rolled, and bonded around a mandrel of 8 mm in diameter in the order of A/B/C from the innermost layer side, to obtain a paper tube made of a base paper for paper tubes with an overall basis weight of 270 g/m².

Example 2

A paper tube made of a base paper for paper tubes with an overall basis weight of 270 g/m² was obtained in the same manner as in Example 1, except that adhesive b (water-soluble adhesive, based on water-resistant polyvinyl alcohol) was used.

Comparative Example 1

A paper tube made of a base paper for paper tubes with an overall basis weight of 270 g/m² was obtained in the same manner as in Example 1, except that adhesive c (water-dispersible adhesive, based on vinyl acetate) was used.

The paper tubes obtained in Examples 1, 2, and Comparative Example 1 were evaluated for the following. The results are shown in Table 2.

<Elution Rate>

The elution rate was calculated based on the aforementioned method, from a measured sample of approx. 2 g prepared by cutting each paper tube to a length of 1 cm.

<Peeling>

Each paper tube was cut to a length of approx. 1 cm using a manual paper cutting machine immediately after manufacturing and 60 minutes after manufacturing, and visually evaluated for the degree of peeling of paper layers on the cut face.

○: The paper layers did not peel at all.

Δ: The paper layers had peeled by no more than one quarter the circumference of the paper tube.

×: The paper layers had peeled by more than one quarter the circumference of the paper tube.

<Sticking Feel>

Each paper tube was held between the lips, like a plastic straw, for 10 seconds and evaluated based on the criteria below.

○: Does not stick to the lips.

Δ: Sticks slightly to the lips.

×: Sticks to the lips.

The base paper for paper tubes manufactured in Comparative Example 1 had a high elution rate of 2.17 percent and the filtered-out liquid solution was cloudy.

On the other hand, the base papers for paper tubes manufactured in Examples 1, 2 and conforming to the present invention had a low elution rate of 1 percent or lower and the filtered-out liquid solution was also transparent. Additionally, the paper tube manufactured in Example 2 using adhesive b exhibited slightly lower adhesive force between the layers immediately after manufacturing, but the layers were firmly attached 60 minutes thereafter.

When held between the lips, all paper tubes stuck to the lips and produced a strong unpleasant sensation during use. Also, the obtained paper tubes had notable gaps at the overlapping parts of paper layer C on the outermost surface because the paper layer used as the outermost layer had a large paper thickness of 130 μm.

<Measurement of Change in Adhesive Force Over Time>

According to Examples 1, 2, and Comparative Example 1 above, adhesive b manifested adhesive strength slowly. To confirm how the manifestation of adhesive strength varied by adhesive, paper layers A to D and adhesives a to c in Table 1 above were used to measure change in adhesive force over time.

Two paper layers were produced for each paper layer type, both cut to 100 mm lengthwise×50 mm widthwise, and each adhesive was dripped between the two paper layers and the two paper layers were pressed with rubber rollers to spread the adhesive in between and also squeeze out any excess adhesive, after which the paper layers were peeled by 40 mm from one lengthwise edge part side, to prepare a sample.

Thirty seconds after bonding, the sample was set on a longitudinal tensile tester (Tensilon, manufactured by A&D Co., Ltd.) with the peeled lengthwise edge parts gripped by the top and bottom jigs, respectively, and the sample was peeled from the lengthwise edge part side at a speed of 5 mm/min to measure how the peel strength, i.e., adhesive strength, changed over time.

Table 3 shows the time it took for each paper layer type to break as a result of the paper layers not peeling from the adhesive layer at the interface, while FIG. 1 shows how the adhesive force on paper layer A, which did not cause paper layer breakage, changed over time.

TABLE 3

| | | Adhesives | | |
|---|---|---|---|---|
| | | a | b | c |
| Paper layers | A | Did not break | Did not break | Did not break |
| | B | 8 seconds | 650 seconds | 70 seconds |
| | C | 55 seconds | 590 seconds | 40 seconds |
| | D | 7 seconds | 530 seconds | 35 seconds |

On paper layers B to D, water-dispersible adhesives a, c manifested adhesive strength more quickly than water-soluble adhesive b, causing paper layer breakage to occur in shorter periods of time.

Paper layer A, being water resistant, allowed water to volatilize slowly and thus did not experience paper layer breakage during the measurement time; however, the rise in adhesive strength thereon was faster with water-dispersible adhesives a, c than with water-soluble adhesive b.

The foregoing confirms that water-dispersible adhesives manifest adhesive strength earlier compared to water-soluble adhesives.

Example 3

Paper layers A, C were coated with adhesive a to a solids content of 20 g/m² between each pair of layers and then stacked, spiral-rolled and bonded around a mandrel of 8 mm in diameter in the order of A/C/C/A from the innermost layer side, to obtain a paper tube made of a base paper for paper tubes with an overall basis weight of 340 g/m².

Example 4

A paper tube made of a base paper for paper tubes with an overall basis weight of 300 g/m² was obtained in the same manner as in Example 3, except that paper layers A, B were stacked in the order of A/B/B/A from the innermost layer side.

Example 5

A paper tube made of a base paper for paper tubes with an overall basis weight of 360 g/m² was obtained in the same manner as in Example 3, except that paper layers A, C, D were stacked in the order of A/C/C/D from the innermost layer side.

The paper tubes obtained in Examples 3 to 5 were evaluated in the same manners as described above. The results are shown in Table 4.

TABLE 4

| | Paper layers | | | Elution | Peeling | | |
|---|---|---|---|---|---|---|---|
| | Innermost layer | Outermost layer | Adhesive | rate % | Immediately after | 60 minutes after | Sticking feel |
| Example 3 | | A/C/C/A | a | 0.19 | ○ | ○ | ○ |
| Example 4 | | A/B/B/A | a | 0.49 | ○ | ○ | ○ |
| Example 5 | | A/C/C/D | a | 0.26 | ○ | ○ | Δ |

The base papers for paper tubes manufactured in Examples 3 to 5 had a low elution rate of 0.5 percent or lower and the filtered-out liquid solution was also transparent. Additionally, excellent adhesive strength was achieved immediately after manufacturing, and cutting the paper immediately after manufacturing did not cause peeling between the paper layers.

The paper tubes obtained in Examples 3, 4 that used paper layer A (smoothness 1,547 seconds, paper thickness 30 μm) as the outermost layer, were free from sticking feel on the lips and felt just like using a plastic straw. Also, on the outermost surfaces of the obtained paper tubes, the overlapping parts of paper layer A had small gaps and were smooth.

The paper tube obtained in Example 5 that used paper layer D (smoothness 152 seconds, paper thickness 78 μm) as the outermost layer, stuck slightly to the lips when held between them, but any unpleasant sensation was minimal. Also, on the outermost surface of the obtained paper tube, the overlapping parts of paper layer D had relatively small gaps and were generally smooth.

What is claimed is:

1. A paper straw which is constituted by a base paper, wherein:
   the base paper has two or more but no more than five paper layers,
   the paper layers are bonded by a water-soluble or water-dispersible adhesive,
   the base paper has an elution rate of 2.0 percent or lower, and
   an outermost layer of the paper layers has a surface smoothness of 150 seconds or higher based on JIS P 8155: 2010 (Oken Method).

2. The paper straw according to claim 1, characterized in that the adhesive is water-dispersible.

3. The paper straw according to claim 1, characterized in that its diameter is 3 mm or more but no more than 20 mm.

4. The paper straw according to claim 1, characterized in that an outermost layer of the paper layers has a thickness of 25 μm or more but no more than 100 μm.

5. The paper straw according to claim 4, characterized in that the adhesive is water-dispersible.

* * * * *